US007523465B2

(12) United States Patent
Aamodt et al.

(10) Patent No.: US 7,523,465 B2
(45) Date of Patent: Apr. 21, 2009

(54) METHODS AND APPARATUS FOR GENERATING SPECULATIVE HELPER THREAD SPAWN-TARGET POINTS

(75) Inventors: Tor M. Aamodt, Toronto (CA); Hong Wang, San Jose, CA (US); John Shen, San Jose, CA (US); Per Hammarlund, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 769 days.

(21) Appl. No.: 10/422,528

(22) Filed: Apr. 24, 2003

(65) Prior Publication Data

US 2004/0154019 A1 Aug. 5, 2004

Related U.S. Application Data

(63) Continuation-in-part of application No. 10/356,435, filed on Jan. 31, 2003.

(51) Int. Cl.
*G06F 3/00* (2006.01)
*G06F 9/44* (2006.01)
*G06F 9/46* (2006.01)
*G06F 13/00* (2006.01)

(52) U.S. Cl. .................................... 719/320
(58) Field of Classification Search .................. 719/320
See application file for complete search history.

(56) References Cited

U.S. PATENT DOCUMENTS

| 6,212,542 | B1* | 4/2001 | Kahle et al. ............. 718/102 |
| 6,263,404 | B1* | 7/2001 | Borkenhagen et al. ...... 711/137 |
| 6,317,816 | B1* | 11/2001 | Loen .................... 711/171 |
| 6,341,347 | B1* | 1/2002 | Joy et al. ............... 712/228 |
| 6,351,808 | B1* | 2/2002 | Joy et al. ............... 712/228 |
| 6,389,446 | B1* | 5/2002 | Torii .................... 718/100 |
| 6,463,526 | B1* | 10/2002 | Chaudhry et al. ......... 712/228 |
| 6,574,725 | B1* | 6/2003 | Kranich et al. ........... 712/31 |
| 6,928,645 | B2* | 8/2005 | Wang et al. ............. 718/102 |
| 6,950,908 | B2* | 9/2005 | Shibayama et al. ........ 711/144 |
| 7,082,601 | B2* | 7/2006 | Ohsawa et al. ........... 717/149 |
| 7,131,082 | B2* | 10/2006 | Tsukiyama et al. ........ 716/4 |
| 7,343,602 | B2* | 3/2008 | Luk et al. .............. 718/100 |
| 2002/0138717 | A1* | 9/2002 | Joy et al. ............... 712/235 |
| 2002/0144083 | A1* | 10/2002 | Wang et al. .............. 712/23 |

(Continued)

OTHER PUBLICATIONS

Pedro Marcuello and Antonio Gonzlez. "Thread-Spawning Schemes for Speculative Multithreading." 8th International Symposium on High-Performance Computer Architecture, pp. 55-64, Feb. 2, 2002.*

(Continued)

*Primary Examiner*—Meng-Ai An
*Assistant Examiner*—Diem K Cao
(74) *Attorney, Agent, or Firm*—Hanley, Flight & Zimmerman, LLC (57) ABSTRACT

Methods and an apparatus for generating a speculative helper thread for cache prefetch are disclosed. The disclosed techniques select spawn-target pairs based on profile data and a series of calculations. Helper threads are then generated to launch at the selected spawn points in order to prefetch software instructions (or data) for a single-threaded software application. The generated helper threads are then attached to the single-threaded software application to create a multi-threaded software application.

31 Claims, 7 Drawing Sheets

U.S. PATENT DOCUMENTS

| | | | | |
|---|---|---|---|---|
| 2003/0014473 | A1* | 1/2003 | Ohsawa et al. | 709/107 |
| 2003/0014602 | A1* | 1/2003 | Shibayama et al. | 711/156 |
| 2004/0054990 | A1* | 3/2004 | Liao et al. | 717/124 |
| 2004/0133767 | A1* | 7/2004 | Chaudhry et al. | 712/225 |

OTHER PUBLICATIONS

Pedro Marcuello and Antonio Gonzlez. "Thread-Spawning Schemes for Speculative Multithreading." 8th International Symposium on High-Performance Computer Architecture, pp. 55-64, Feb. 2, 2002.*

Craig Zilles and Gurindar Sohi. "Execution-based Prediction Using Speculative Slices." 28th Annual International Symposium on Computer Architecture (ISCA 2001), Jul. 2001.*

Marcuello, Pedro; Gonzalez, Antonio; and Tubella, Jordi. "Speculative Multithreaded Processors". International Conference on Supercomputing, 1998.*

Marcuello, Pedro and Gonzalez, Antonio. "Clustered speculative multithreaded processors". International Conference on Supercomputing, 1999.*

Aamodt et al, Prescient Instruction Prefetch, Intel Labs, University of Toronto, Department d'Arquitecture de Computadors, UPC, Barcelone, Intel Corp, 2002, pp. 1-8.*

Aamodt, T; Chow, P; Hammarlund, P; Wang, H; Shen, J. *Hardware Support for Prescient Instruction Prefetch*. Proceedings of the 10th International Symposium on High Performance Computer Architecture, Feb. 2004.

Marcuello, P; Gonzalez, A. *Thread-Spawning Schemes for Speculative Multithreading*. Proceedings of the Eighth International Symposium on High-Performance Computer Architecture, IEEE, 2002.

Collins, J; Wang H; Tullsen D; Hughes, C; Lee, Y; Lavery, D; Shen, J. *Speculative Precomputation: Long-range Prefetching of Delinquent Loads*. Proceedings of the 28th International Symposium on Computer Architecture, Jul. 2001.

Sarkar, V. *Determining Average Program Execution Times and Their Variance*. ACM SIGPLAN 1989 Conference on Programming language design and implementation, 1989. pp. 298-312.

Chappell, R; Tseng, F; Yoaz, A; Patt, Y. *Difficult-Path Branch Prediction Using Subordinate Microthreads*. Proceedings of the 29th International Symposium on Computer Architecture, 2002. pp. 307-317.

Liao, S; Wange, P; Wange, H; Hoflehner, G; Lavery, D; Shen, J. *Post-Pass Binary Adaptation for Software-Based Speculative Precomputation*. SIGPLAN 2002 Conference on Programming Language Design and Implementation, 2002. pp. 117-128.

Sohi, G; Zilles, C. *Understanding the Backward Slices of Performance Degrading Instructions*. 27th ISCA, 2000. pp. 172-181.

Weiser, M. Program Slicing. 1981. pp. 439-449.

Tarjan, R. "A Unified Approach to Path Problems". *Journal of the Associations for Computing Machinery*. ACM, 1981. vol. 28, No. 3, pp. 577-593.

Tarjan, R. "Fast Algorithms for Solving Path Problems." *Journal of the Association for Computing Machinery*. ACM, 1981. vol. 228, No. 3, pp. 594-614.

* cited by examiner

METHODS AND APPARATUS FOR GENERATING SPECULATIVE HELPER THREAD SPAWN-TARGET POINTS

RELATED APPLICATIONS

This application is a continuation-in-part of U.S. patent application Ser. No. 10/356,435, filed on Jan. 31, 2003.

TECHNICAL FIELD

The present disclosure pertains to helper threads for multi-threading processors and, more particularly, to methods and an apparatus for generating speculative helper threads and determining the progress of a speculative helper thread relative to a corresponding non-speculative primary thread.

BACKGROUND

Consumers continue to demand faster computers. Simultaneous multi-threading (SMT) is an effective way to boost throughput performance with limited impact on processor die area. SMT increases processor throughout by executing a plurality of processing threads in parallel. However, many software applications do not benefit from SMT.

In addition, the gap between processor and memory speed continues to widen. As a result, computer performance is increasingly determined by the effectiveness of the cache hierarchy. Prefetching is a well-known and effective technique for improving the effectiveness of the cache hierarchy. However, processor workloads typically incur significant cache misses.

DETAILED DESCRIPTION

Generally, an architectural mechanism using speculative thread-level parallelism to enable more efficient cache prefetching is disclosed. Although the examples illustrated herein refer to performance loss due to instruction cache (I-cache) misses and prefetching, a person of ordinary skill in the art will readily appreciate that the techniques disclosed herein may be used for any type of helper thread. For example, the techniques disclosed herein may be used for data cache prefetching.

In particular, an algorithm for optimizing helper threads that exploits multithreaded hardware to improve application performance by performing judicious and timely (or "prescient") instruction and/or data prefetch is described. Profile information is used to identify code regions that incur performance loss due to I-cache misses. For each target point identified in the software application, a corresponding spawn point is identified that can serve as a triggering point for initiating the execution of a helper thread for instruction prefetching. Once a spawn-target pair is identified, a helper thread is generated and attached to the original application binary (i.e., the main thread). When a spawn point is encountered in the main thread at run-time, a helper thread is spawned to begin execution in an idle thread context. The execution of the helper thread effectively prefetches for anticipated I-cache misses along a short path subsequent to the target point.

Figure 1:
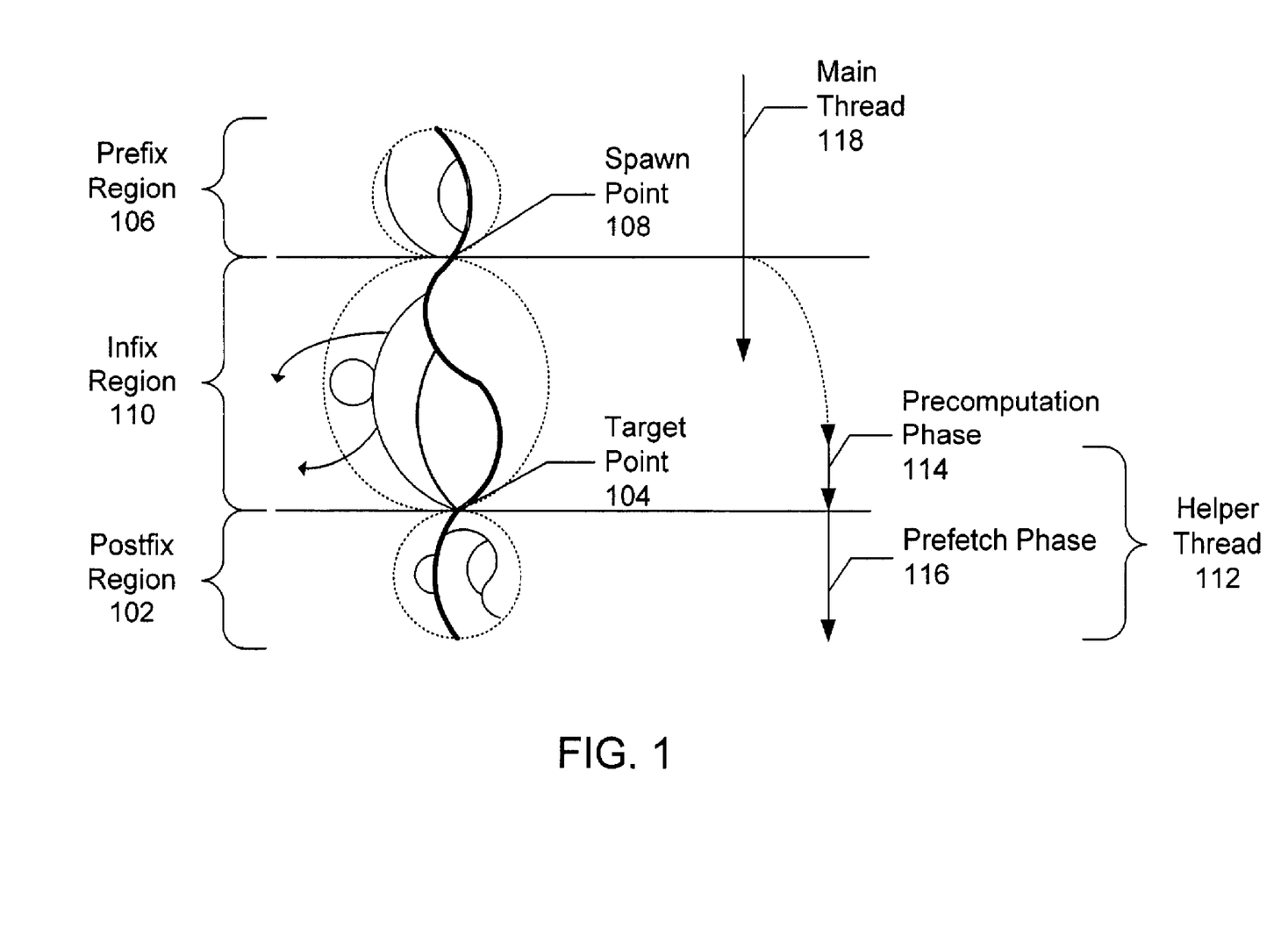
FIG. 1 is a diagram of a program fragment containing three control-flow regions.

A diagram representing an illustrative main thread 118 program fragment containing three distinct control-flow regions is illustrated in FIG. 1. In the illustrated example, a postfix region 102 following a target point 104 is predicted to suffer heavy performance loss due to instruction cache misses. For simplicity in explanation, a region 106 before a spawn point 108 is called the prefix region 106, and a region 110 between the spawn point 108 and target point 104 is called the infix region 110.

Effective instruction prefetch benefits from accurate resolution of branches in the postfix region 102. Accordingly, a helper thread 112 may include two phases of execution. Specifically, the helper thread 112 execution may include a pre-computation phase 114 and a prefetch phase 116. During the precomputation phase 114, the helper thread 112 determines one or more live-in values in the infix region 110 before starting to execute the prefetch phase 116 in the postfix region 102. The instructions executed by the helper thread 112 during the precomputation phase 114 corresponds to a subset (referred to as a "backward slice") of instructions from the main thread in the infix region 110 that fall between the spawn point 108 and the target point 104. During the prefetch phase 116, the helper thread 112 executes code in the postfix region 102. Execution of code in the prefetch phase 116 both resolves control flow for the helper thread 112 in the postfix region 102 and prefetches instructions for the main thread 118.

Preferably, for a given target point 104, a spawn point 108 is selected that is far enough ahead to provide enough slack for prefetching instructions without being so far ahead as to evict instructions residing in the cache that are still useful to the main thread 118, potentially causing overall performance to degrade. Similarly, prefetching instructions that could have been encountered by the main thread 118 shortly, but which are not actually encountered until much later, can also degrade performance. Therefore, it is preferred that the distance between the spawn point 108 and the target point 104 is large, but also that there is strong control-flow correlation between the spawn point 108 and the target point 104. Two points in a control-flow graph are strongly control-flow correlated if the execution of one implies the high probability of the execution of the other.

Control-flow correlation consists of two factors: a forward probability of reaching a target point 104 from a spawn point 108, and a reverse (or posteriori) probability, that the spawn point 108 precedes the target point 104. The former attribute ensures that the speculative execution of the helper thread 112 will not be in vain due to the actual control-flow of the main thread 118 not traversing to the target point 104. However it is the later that quantifies the potential benefit of a helper thread 112.

The identification of appropriate spawn-target points 108, 104 that define the associated helper threads 112 is disclosed as an optimization problem. The optimization technique models runtime program behavior as a discrete Markov process with statistics derived from profile data. This formulation enables the accurate estimation of important statistical quantities related to helper thread 112 execution via an efficient computational strategy. This formulation leads to the spawn-target pair 108, 104 selection algorithm described in detail below. This algorithm may be implemented by any processor architecture, such as the Itanium Processor Family (IPF) architecture.

The Markov model formulation is used to quantify the benefit of spawning an instruction prefetch thread that runs ahead starting at a given target point 104, when the main thread 118 reaches a given spawn point 108. In particular, path expressions are used to efficiently compute certain information describing expected program behavior regarding execution between any two points in the program binary. The computed information includes (i) the probability of reaching a second point in a program given that a first point in the program is reached, (ii) the statistically expected (e.g., average) number of instructions that will be executed between two points in a program, (iii) the required instruction storage space when traversing between the two points, (iv) the probability a particular basic block was executed previously given the current execution point in the program, and (v) a measure of how recently the execution of the earlier block occurred.

For a control flow graph where nodes represent basic blocks, and edges represent transitions between basic blocks, the intra-procedural program execution is modeled as a discrete Markov chain. The basic blocks represent states. State transitions are represented by the probabilities of branch outcomes in the control flow graph. These probabilities are based upon edge profile information that represents the likelihood that one block will flow to/from another block assuming independent branch outcomes. As recognized by a person of ordinary skill in the art, the Markov chain can be constructed using states and transition probabilities representing the joint probability of taking a particular path segment (of a given length) through the original control flow graph (e.g., the probability of starting at block A, branching to block B, and then branching to C).

For inter-procedural control flow the effect of procedure calls restricting transitions into and out of procedures is modeled so that a procedure must return to its caller. In particular, a transition from the Markov model to a inter-procedural model is made when the basic block representing the current state ends in a procedure call, after first waiting for the usual transition time (associated with the current basic block) to elapse. When the state associated with the exit block of a procedure is entered, control returns to the calling block.

To model the effects of instruction memory a two-level instruction memory hierarchy is assumed. The memory includes a finite size fully associate instruction cache with a least recently used (LRU) replacement policy so that all misses are either cold start misses or capacity misses. The simplicity of this model does not in any way limit the applicability of the spawn-target selection algorithm to computer systems with only this memory configuration, but rather this simplicity aids the analysis of all systems that including a cache hierarchy including any number of levels of cache (unified or separate), and any degree of associatively. In the equations below, the symbol "$" is used to represent the number of instructions that may be stored in the instruction cache. Note that the control-flow path of the program entirely determines the contents of this cache. By considering the probabilities of all such paths given by the statistical model of control flow, it is possible (in principle) to obtain a probability that any particular instruction is in the cache at a particular point in the program when the model enters a given state (basic block). In the formulation herein, a quantity related to this probability is computed instead (the expected path footprint). For the purpose of estimating the contents of the instruction cache, a cache line size of one instruction is assumed. A real instruction cache would use a line size of several instructions to exploit spatial locality.

Tarjan's fast path expression algorithm solves the single-source path problem. We leverage the efficiency of Tarjan's fast path expression algorithm by finding path expression mappings. These mappings transform the evaluation of a generalized sum over all paths between two points in the control-flow graph into the evaluation of a formula representing these paths. The formulation is significant in that it captures a potentially infinite set in a very compact closed-form expression. To describe the mappings that underlie the transformations usedit is helpful to first introduce the following standard terminology (similar to that used by Tarjan in his publications on the path expression algorithm). A "directed graph" G(V,E) contains vertices v in V, and edges e=(u,v) in E such that u and v are in V, where u is the head of edge e, and v is the tail of edge e. An edge is considered to lead from the head to the tail. In many cases, edges are labeled to obtain a "labeled directed graph." Given a finite alphabet Σ with elements a ∈Σ disjoint from the symbols {Λ,Ø,(,)}, "Λ", "Ø", and a ∈Σ are atomic regular expressions, and if $R_1$ and $R_2$ are regular expressions, then "$(R_1 \cup R_2)$", "$(R_1 \bullet R_2)$", and "(R1)*" are compound regular expressions. The symbol Λ represents the empty string, Ø represents the empty set, ∪ represents union, ● represents concatenation, and * represents transitive closure under concatenation.

A "path expression" P(x,y) on directed graph G(V,E) is a regular expression over the set of edges in E summarizing all paths between vertices x and y in G. The path expression has a "start point" x and an "endpoint" y. All path expressions have a uniquely defined start point and endpoint. When constructed as done by Tarjan's fast path algorithm, a path expression enumerates each distinct path between x and y in a unique way. Such path expressions are said to be "unambiguous." Unambiguous path expressions are required to obtain correct results when the union operator's behavior is not idempotent (i.e., it is not necessarily true that x∪x=x). The set of all paths enumerated by P(x,y) is denoted σ(P(x, y)). In this disclosure we call σ(P(x,y)) the path set between x and y. An "open path expression" $P_0(x,y)$ denotes the set of all paths from x to y, such that y appears only at the end of each path (and beginning of a path if and only if x=y).

Figure 2:
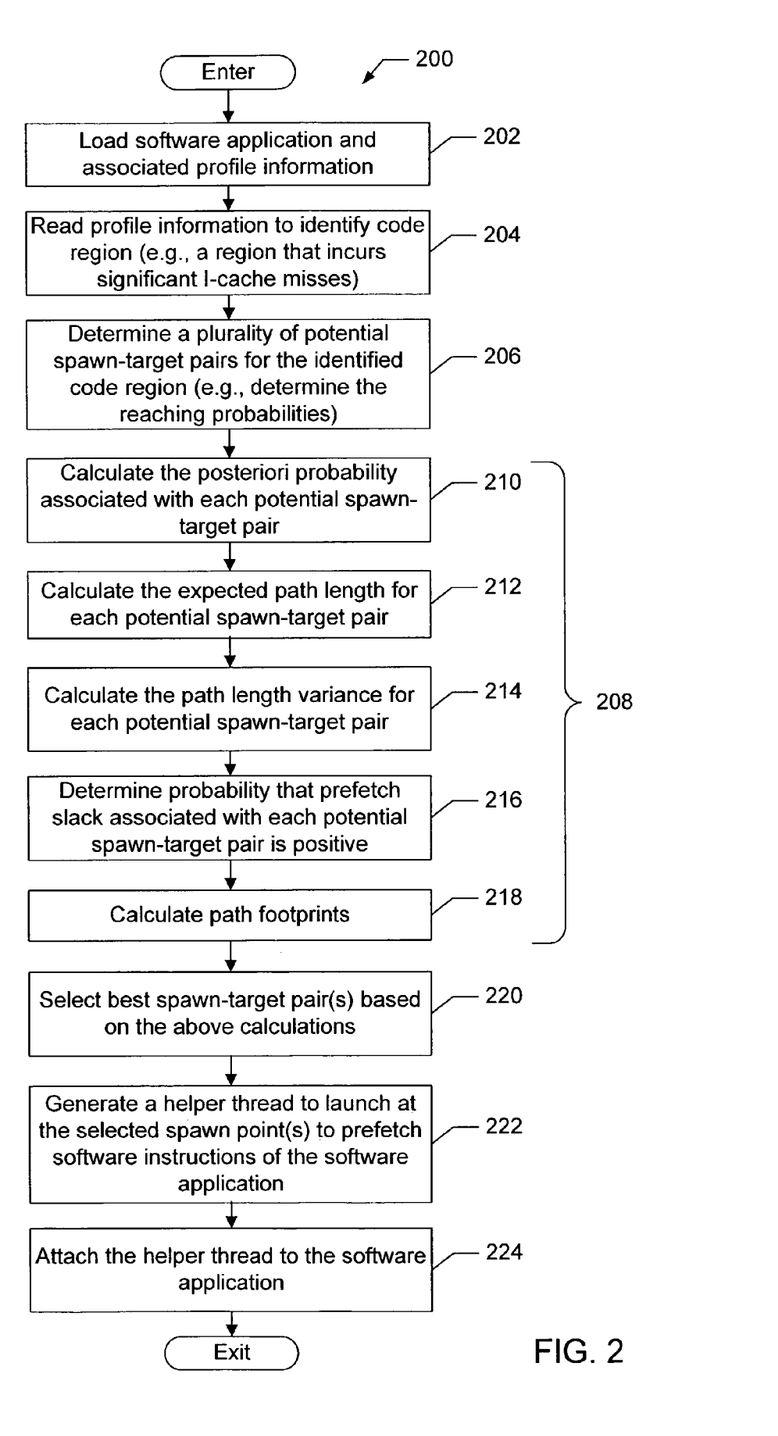
FIG. 2 is a flowchart illustrating an example process for generating speculative helper threads.

An example process 200 for generating a speculative helper thread(s) 112 for instruction cache prefetch is illustrated in FIG. 2. Preferably, the process 200 is embodied in one or more software programs that are stored in one or more memories and executed by one or more processors in a well-known manner. However, some or all of the blocks of the process 200 may be performed manually. Although the process 200 is described with reference to the flowchart illustrated in FIG. 2, a person of ordinary skill in the art will readily appreciate that many other methods of performing the process 200 may be used. For example, the order of many of the blocks may be altered, the operation of one or more blocks may be changed, blocks may be combined, and/or blocks may be eliminated.

In general, the example process 200 selects spawn-target pairs 108, 104 based on profile data and a series of calculations described in detail below. The process 200 then generates helper thread code to launch at the selected spawn points 108 in order to prefetch software instructions for a software application. The generated helper thread code is then attached to the software application to create a multi-threaded software application.

The example process 200 illustrated begins by loading a software application and associated profile information (block 202). Typically, the software application and the associated profile information are loaded into main memory 108 from the hard disk drive 116. The profile information may be generated by a cache profiling program and then read to identify code regions that incur performance loss due to I-cache misses (block 204). Alternatively, the profile information may be generated by a hardware-based profiler and/or by code inspection techniques. In one example, only certain blocks are targeted (e.g., blocks that account for the top 90% of all instruction cache misses).

Figure 3:
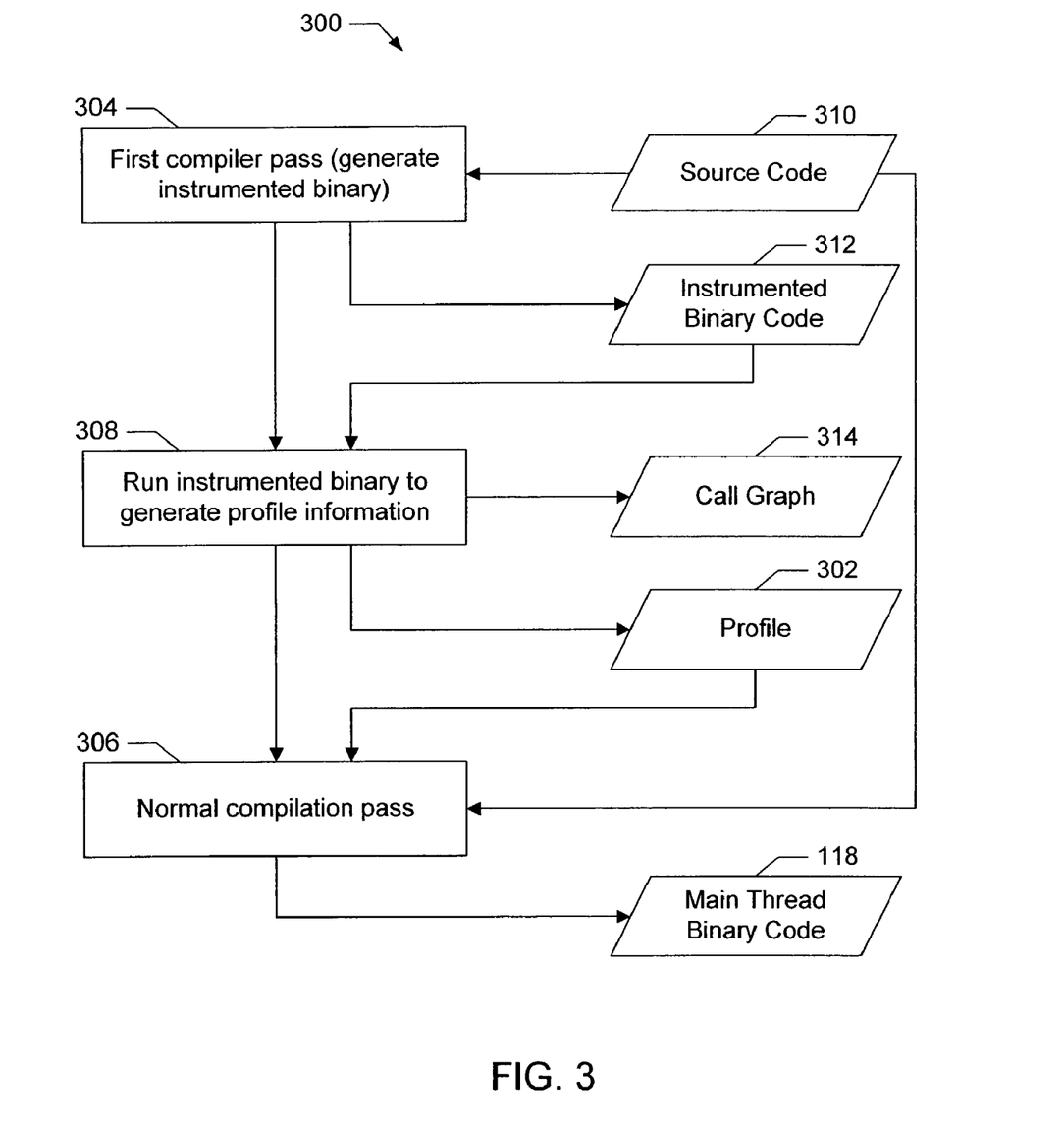
FIG. 3 is a flowchart illustrating an example process for generating profile information.

An example process 300 for generating profile information is illustrated in FIG. 3. Preferably, the process 300 is embodied in one or more software programs, which are stored in one or more memories and executed by one or more processors in a well-known manner. Profile information 302 is typically generated by one or more instrumentation and execution passes. In FIG. 3, the process 300 involves two compiler-performed passes 304, 306 and also involves a test run 308 that is typically initiated by a user, such as a software programmer. During a first pass 304, a compiler (e.g., 709 in FIG. 6) receives as an input the source code 310 for which compilation is desired. The compiler then generates instrumented binary code 312 that corresponds to the source code 310. The instrumented binary code 312 includes, in addition to the binary for the source code 310 instructions, extra binary code that causes, during a run of the instrumented code 312, statistics to be collected and recorded in a profile 302 and a call graph 314. When a user initiates a test run 308 of the instrumented binary code 312, the profile 302 and call graph 314 are generated. During the normal compilation pass 306, the profile 302 is used as an input into the compiler and a binary code file 118 is generated. The profile information 302 may be used, for example, by the compiler during the normal compilation pass 306 to aid with performance enhancements such as speculative branch prediction.

Each of the passes 304, 306, and the test run 308, are optional to the method 300. One skilled in the art will recognize that any method of generating the information represented by profile 302 may be utilized, and that the actions 304, 306, 308 depicted in FIG. 3 are provided for illustrative purposes only. One skilled in the art will also recognize that the method 300 described herein may be applied, in an alternative embodiment, to a binary file. That is, the profile 302 may be generated for a binary file rather than a high-level source code file, and profile analysis may be performed using such binary-based profile as an input.

Returning to FIG. 2, once the profile information is read, the process 200 determines a plurality of potential spawn-target pairs 108, 104 for the identified code region (block 206). In one example, determining a plurality of potential spawn-target pairs 108, 104 for the identified code region includes a determination of the "reaching probability" associated with each potential spawn-target pair 108, 104. The "reaching probability" RP(x,y) between two states x and y in the Markov model can be formally defined as the probability that state y will be encountered at some time in the future given the current state is x. The point y is said to be "control quasi-independent" of the point x if the reaching probability from x to y is above a given threshold (for example 95 percent).

The (intra-procedural) reaching probability can be determined by labeling all transitions in the Markov model for a given procedure with their transition probability. When x≠y, RP(x,y) is evaluated by first setting the probability of edges leaving y to zero before evaluating the path expression.

Given path expressions $R_1$ and $R_2$, with probabilities p and q, respectively, the operators used below are interpreted as follows where square braces denote evaluation of the enclosed path expression.

| | |
|---|---|
| concatenation | $[R_1 \cdot R_2] = pq$ |
| union | $[R_1 \cup R_2] = p + q$ |
| closure | $[R_1^*] = \dfrac{1}{1-p}$ |

When computing the reaching probability, the empty set $\emptyset$ (i.e., "no path exists") is interpreted as zero, and the null string $\Lambda$ (i.e., the set representing the trivial path from a node to itself containing no control-flow edges and only the one basic block itself) is interpreted as one. This formulation described herein computes the sum over all paths of the probability of taking any particular path between x and y.

Note that, ignoring the limitations of finite precision arithmetic, division by zero cannot happen provided the profile information used to define edge probabilities represents a real program execution branch profile with a distinguished exit block. (Theoretically, division by zero represents the presence of an infinite loop.) A person skilled in the art will recognize that another solution is to extend the number system used for evaluating intermediate results to include infinity, and to define multiplication of zero and infinity to equal zero.

Figure 4:
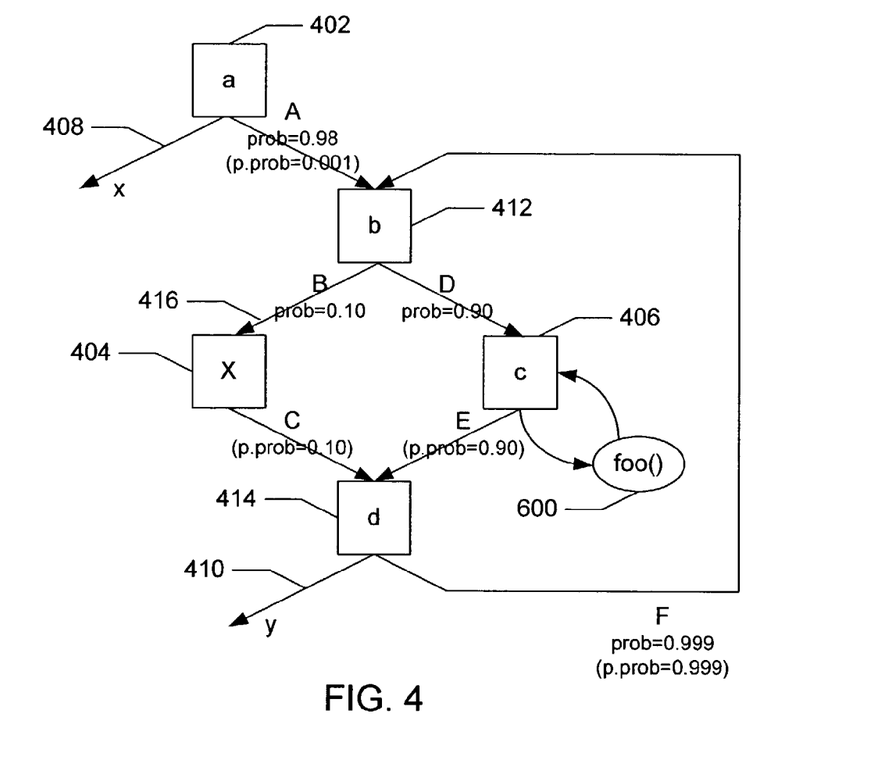
FIG. 4 is an example control flow graph that calls an example procedure.

An example control flow fragment is shown in FIG. 4. A determination of the reaching probability from block a (402) to block X (404) is described below.

$$P(a, X) = A \cdot ((B \cdot C \cup D \cdot E) \cdot F)^* \cdot B$$

$$[P(a, X)] = 0.98 \cdot \left( \frac{1}{1.0 - (0.1(0.0) + 0.90(1.0)) \cdot (0.999)} \right) \cdot 0.10$$

$$\cong 0.97$$

When x=y, the path expression P(x,x) is the closure of all the paths between x and itself that only include x as their endpoints. To remain consistent with the definition, the effects of the closure operator must be undone for the case x=y. Thus, the reaching probability from x to x (i.e., probability of leaving x, and returning back to x) is determined using the relation:

$$RP(x, x) = \frac{[P(x, x)] - 1}{[P(x, x)]}$$

Note that for the case x≠y this formulation of reaching probability allows x to appear multiple times before y. The reaching probability can also be defined so that it includes only execution outcomes for which x appears at the beginning of each path by setting the probabilities of the incoming edges to x to zero before evaluating P(x,y). This last-to-first reaching probability $RP_{LF}(x,y)$ is used below to compute the posteriori probability.

Next, the inter-procedural reaching probability is considered. In particular, consider the probability of reaching y, given that y is in a procedure called from the procedure containing x, given the program is currently at x, assuming that y must is reached before the procedure call containing this particular instance of x returns. This reaching probability is found by summarizing the probability of reaching y from the entry of every procedure encountered in a bottom up traversal of the call graph between the procedure containing y and the procedures called by x.

For each procedure visited, the graph representing the Markov chain for the procedure is augmented with an additional state Q representing the event that y is reached, and each state representing a basic block that makes a procedure call to a callee procedure that can in turn potentially reach y is replaced by two states. The inflowing edges to the original state go to the first of these two states, the outgoing edges emanate from the second of the new states. Finally, the two states are connected by an edge with probability of one minus the reaching probability from the callee's entry to y. The first state is also connected to Q, by an edge with the reaching probability from the callee's entry to y. The probability of reaching y from the entry of the procedure is then determined by computing the reaching probability from the entry state to the new state. For the procedure containing x, the same transformation is used except that instead of computing the reaching probability from the entry to Q, the reaching probability from x to Q is computed. If the traversal from x to y contains recursion, the process outlined above can be modified by solving a set of simultaneous equations formed by representing the probability of reaching y with a symbolic variable.

Once a plurality of potential spawn-target pairs 108, 104 are determined, one or more spawn-target selection calculations 208 are performed in order to select one or more spawn-target pairs. One calculation that may be performed on each spawn-target pair 108, 104 is a determination of the posteriori probability associated with each potential spawn-target pair 108, 104 (block 210). The posteriori probability PPr(X|Y) between two states X and Y can be formally defined as the probability of having previously visited state X since the last occurrence of state Y (if any), given the current state is Y. Choosing a spawn point 108 with low posterior probability for a given target is inefficient in the sense that it will only trigger prefetch threads for a small fraction of the occurrences of the target. Therefore, it makes sense to favor spawn points 108 that have high posteriori probability as well as high reaching probability The intra-procedural posteriori probability can be computed by considering the last-to-first reaching probability problem on the time-reversed version of the Markov chain model. The time-reversed version is obtained by reversing control flow edges and labeling them with the frequency with which the predecessor preceded the successor rather than the frequency with which the successor followed the predecessor. For x≠y, the edges from x to predecessors of x, as well as the edges from y to successors of y (referring to the original edge orientation) are set to zero.

For example, consider the fragment of control flow in FIG. 4. The posteriori probability that block a (402) was executed given the current block is X (404) is computed by evaluating the following equation with $C^r$ set to zero, where the superscript r indicates we are interested in the edge label associated with the reverse of the graph.

$$P(a,X)=B^r \cdot (F^r \cdot (C^r \cdot B^r \cup E^r \cdot D^r))^* \cdot A^r$$

Thus, $$[P(a, X)] = 1.00 \cdot \left( \frac{1}{1.0 - (0.999) \cdot (0.0(1.0) + 1.0(0.9))} \right) \cdot 0.001$$

$$\cong 0.01$$

So, the posteriori probability that block a (402) was visited before any instance of block X (404) is roughly 0.01. Intuitively, this result follows from the observation that each time the loop is entered, block X (404) is executed roughly 100 times, so the probability that any time we see block X (404) it is the first instance since the loop began is roughly 0.01.

Another calculation that may be performed on each spawn-target pair 108, 104 is a determination of the path length associated with each potential spawn-target pair 108, 104 (block 212). Given a sequence of branch outcomes, the path length is the sum of the, number of instructions, or alternatively the lengths of time spent executing each basic block visited—e.g., the number of instructions multiplied by the per basic block cycles per instruction (CPI), perhaps determined via a sampling based profiling tool such as Intel® Vtune™ Performance Analyzer. The expected or mean path length given that program execution flows between the two points x and y is estimated by associating a tuple with each edge. The first element in the tuple represents the probability of branching from the predecessor to the successor, and the second element represents the length of the predecessor. Similarly, for path expressions $R_1$ and $R_2$ associate tuples <p,X> and <q,Y> are used where the first element of the tuple represents the sum of the probabilities of all the paths and the second element of the tuple represents the expected number of instructions executed. The rules for combining these tuples to evaluate path expressions are:

| | |
|---|---|
| concatenation | $[R_1 \cdot R_2] = \langle pq, X + Y \rangle$ |
| union | $[R_1 \cup R_2] = \left\langle p+q, \frac{pX + qY}{p+q} \right\rangle$ |
| closure | $[R_1^*] = \left\langle \frac{1}{1-p}, \frac{pX}{1-p} \right\rangle$ |

For example, consider the fragment of control flow in FIG. 4. Let the length of each block except block c (406) be 10. For block c (406), the expected path length of the procedure call to foo( ) is included. Suppose this path length is 40, so that the total path length of block c (406) is 50. Then, the expected path length from block a (402) to block X (404) is found by evaluating the following path expression using the mapping given above after first setting the value associated with C to <0,10>.

$$P(a,X)=A \cdot ((B \cdot C \cup D \cdot E) \cdot F)^* \cdot B$$

In detail, this results in:

$$[B \cdot C]=<0,20>$$

$$[D \cdot E]=<0.9,60>$$

$$[B \cdot C \cup D \cdot E]=<0.9,60>$$

$$[(B \cdot C \cup D \cdot E) \cdot F]=<0.8991,70>$$

$$[((B \cdot C \cup D \cdot E) \cdot F)^*] \cong <9.911,623.8>$$

$[((B \cdot C \cup D \cdot E) \cdot F)^* \cdot B] \approx <0.99 11,633.8>$ $[A \cdot ((B \cdot C \cup D \cdot E) \cdot F)^* \cdot B] \approx <0.97,643.8>$ Note that the first element in the final tuple is the reaching probability from block a (402) to block X (404). Computing the expected path length from the entry block to the exit of the procedure summarizes the expected path length of a procedure call. All of the procedure's call sites are augmented with this value.

Another calculation that may be performed on each spawn-target pair 108, 104 is a determination of the path length variance associated with each potential spawn-target pair 108, 104 (block 214). The statistical variance of a variable is a quantity that describes how far away observations of that variable are likely to be from the mean value of that variable. Since program execution can follow numerous paths between two points, it is valuable to be able to quantify this variation to more accurately quantify the expected benefit of a spawn-target pair 108, 104. For instance, when selecting between two spawn points 108, it may be favorable to pick a spawn point 108 with less average slack, if that spawn point 108 also has a smaller variance, because doing so will likely lead to less destructive interference for instances with much larger than average slack.

A detailed statistical derivation, leads to the following mapping for path length variance:

| | Path Length Variance |
|---|---|
| Concatenation [$R_1 \cdot R_2$] | $v + w$ |
| union [$R_1 \cup R_2$] | $\dfrac{(v+X^2)p + (w+Y^2)q}{p+q} - \left(\dfrac{Xp+Yq}{(p+q)}\right)^2$ |
| closure [$R_1^*$] | $\dfrac{(v+X^2)p}{1-p} + \left(\dfrac{X \cdot p}{1-p}\right)^2$ |

In the above table, v and w represent the path length variance of paths summarized by $R_1$ and $R_2$ respectively (which reduces to a value of zero for path expressions consisting of a single edge); X and Y are the expected path length of paths summarized by $R_1$ and $R_2$; and p and q are the probability computed by the reaching probability mapping. As with the reaching probability and expected path length, the edges flowing out of the target are set to have a probability of zero before the mappings are evaluated.

To apply these mappings, a 3-tuple is associated with each edge. The first element in the tuple represents the probability of branching from the predecessor to the successor, and the second element represents the length of the predecessor, and the last element represents the variance. Similarly, path expressions $R_1$ and $R_2$ associate tuples <p,X,v> and <q,Y,w>. Edges leaving y, are, as before, set to zero probability before path expression evaluation.

Another calculation that may be performed on each spawn-target pair 108, 104 is a determination of the estimated probability that a "prefetch slack" associated with each spawn-target pair 108, 104 is positive (block 216). For a given spawn-target pair 108, 104, and assuming the helper thread 112 correctly follows the control-flow the main thread 118 will follow when it reaches the target, the "prefetch slack" is the difference in execution cycles between the time an instruction prefetch is issued from the helper thread 112, and the time the main thread 118 attempts to fetch the same instruction.

The prefetch slack of a particular instance of instruction i, targeted by a helper thread 112 spawned at s with target t, given the program follows a particular execution path is given by the following expression where d(x,y) is the distance between x and y, measured in number of instructions executed; o(s,t) represents the overhead of thread spawning at s and precomputation for live-ins at t; $CPI_m(s,t)$ represents the average cycles per fetched instruction of the main thread 118 in going between the particular instance of s and t; $CPI_m(t,i)$ represents the average cycles per fetched instruction of the main thread 118 in going between the particular instance of t and I; and $CPI_p(t,i)$ represents the average number of cycles per fetched instruction for the helper thread 112 in going between the particular instance of t and i.

$$\text{slack}(i,s,t) = CPI_m(s,t) \cdot d(s,t) + (CPI_m(t,i) - CPI_h(t,i)) \cdot d(t,i) - o(s,t)$$

A given instruction prefetch by a helper thread can reduce the fetch latency of the target instruction in the main thread 118 if it has positive prefetch slack. Effective prefetching typically increases the average instruction per cycle (IPC) of the main thread 118 but not that of the helper thread 112. As a result, while $CPI_p(t,i)$ stays constant, $CPI_m(t,i)$ decreases, leading to an upper bound on how far ahead a instruction prefetch helper thread 112 can run before the main thread 118 will catch up with it. In particular, the main thread 118 will catch the helper thread 112 when:

$$d(t,i) = \frac{CPI_m(s,t) \cdot (d(s,t) - o(s,t))}{CPI_h(t,i) - CPI_m(t,i)}$$

Figure 5:
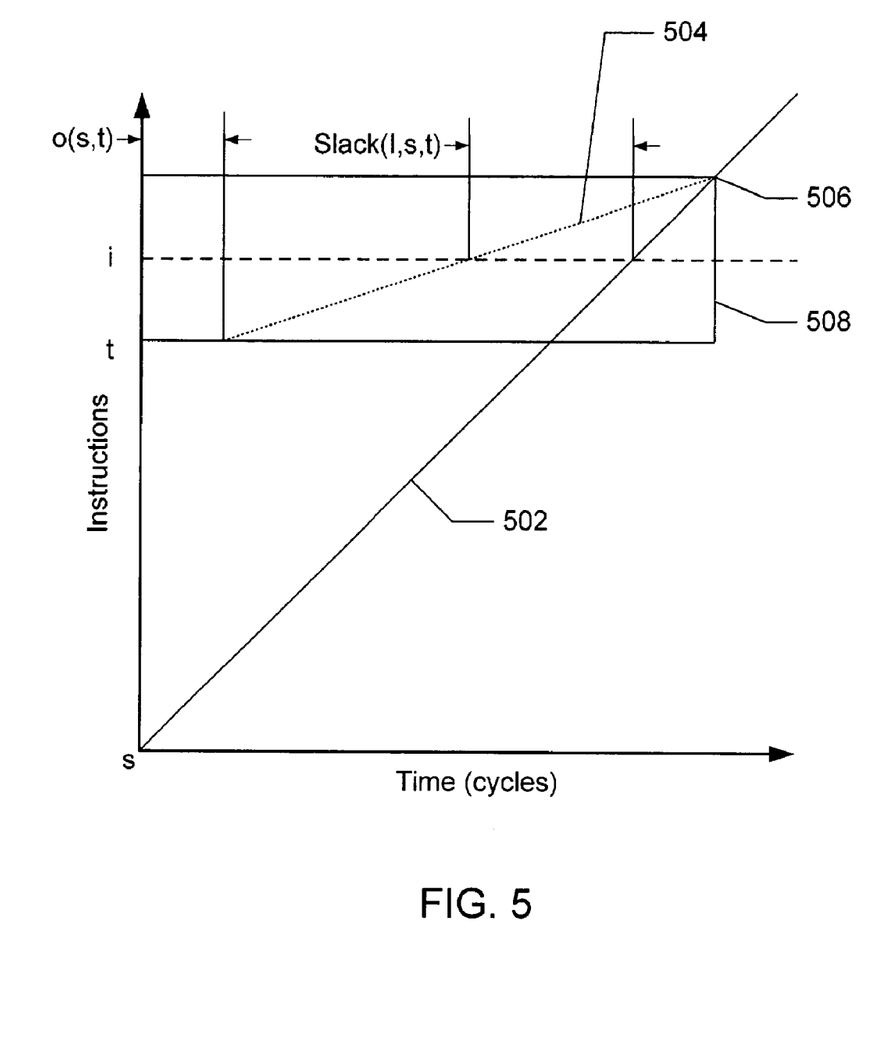
FIG. 5 is a graphical representation of prefetch slack.

FIG. 5 portrays a graphical representation of prefetch slack. In FIG. 5, the solid line 502 indicates the progress of the main thread 118, and the dotted line 504 indicates the progress of the instruction prefetch helper thread 112 after overhead o(s,t) due to thread creation and precomputation 114. The slack of one particular instruction i is shown. The helper thread 112 ceases to provide useful prefetch slack when the main thread 118 catches the helper thread 112. This point 506 is where the dotted line 504 intersects the solid line 502. The distance computed in the equation above corresponds to the height of box 508.

Note that the infix slice 110, corresponding to the two phases 114, 116 of helper thread 112 (as shown in FIG. 1), depends strongly upon the spawn 108 to target 104 path length. This is because increasing the amount of program execution between the spawn point 108 and the target point 104 will increase the number of operations that can potentially affect the outcome of branches after the target point 104, but before the point at which the helper thread 112 terminates. An alternative to taking detailed account of slice size, i.e., using some form of program sliceing, is to assume that increasing the average spawn 108 to target 104 instruction path length is beneficial until the path length is longer than some, empirically determined, constant multiplier of the latency of reaching main memory.

Another calculation that may be performed on each spawn-target pair 108, 104 is a determination of the "expected path footprint" associated with each spawn-target pair 108, 104 (block 218). A path's instruction memory footprint is the minimum amount of instruction memory required to store all the instructions along a given path assuming instructions are stored by their address in a fully associative memory structure. Based upon this definition, the "expected path footprint" is the average instruction memory footprint used in traversing between two points in a program. Using expected path footprints as part of the spawn-target pair 108, 104 selection process helps avoid selecting spawn points 108 that never perform useful instruction prefetching because the instructions they prefetch are likely to be evicted from the instruction cache before the are needed, or are likely to already reside in the cache.

Assuming x and y are in the same procedure, and ignoring the effects of procedure calls, the expected memory footprint between x and y is show in the following equation where $Pr(p|x \rightarrow y)$ is the probability that path p is followed given that the program traverses from x to y and only enter y once at the end of the traversal; f(p) is the instruction memory footprint of the path p; and $\sigma(P_0(x,y))$ is the set of all paths from x to y that include y only at the endpoint.

$$F(x, y) = \sum_{p \in \sigma(P_0(x,y))} \Pr(p \mid x \rightarrow y) \cdot f(p)$$

This is equivalent to:

$$F(x, y) = \frac{1}{RP(x, y)} \cdot \sum_{block\, v \in P_0(x,y)} size(v) \cdot RP_\alpha(x, v \mid \neg y) \cdot RP_\beta(v, y)$$

where size(v) is the number of instructions in basic block v, and $RP_\beta(x,y)$ is defined as, $$RP_\beta(x, y) = \begin{cases} RP(x, y), & x \neq y \\ 0, & x = y \end{cases}$$

and $RP_\alpha(x,v|\neg y)$, which represents the reaching probability from x to v, assuming no path goes through y, is defined as, $$RP_\alpha(x, v \mid \neg y) = \begin{cases} \text{reaching prob. from } x \text{ to } v, \text{ no path through } y, & x \neq v \\ 1, & x = v \end{cases}$$

This value can be computed via the normal reaching probability computation shown above, except that the probabilities of edges leaving y are set to zero (in addition to those leaving v, as for the normal reaching probability calculation). The value of $RP_\alpha(x,v|\neg y)$ can be approximated by $RP(x,v)$, which may speedup the spawn-target selection process at the cost of some loss in precision.

The expected footprint of a procedure h( ) with entry s called precisely n times is:

$$f(h, n) = \sum_{block\, b\, in\, foo} size(b) \cdot (1 - (1 - RP(s, b))^n)$$

Figure 6:
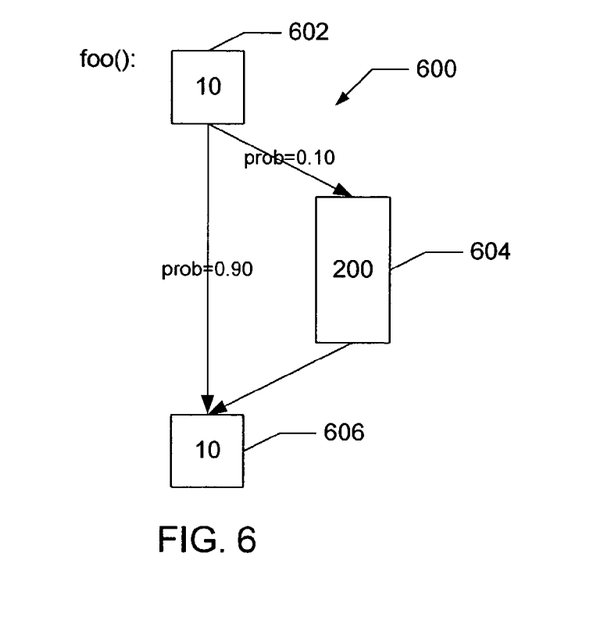
FIG. 6 is an example control flow graph of the example procedure illustrated in FIG. 4.

An example procedure foo( ) 600 is illustrated in FIG. 6. In this example, the procedure 600 contains a first block 602, a second block 604, and a third block 606. The expected execution frequency of block c (406 in FIG. 4), i.e., the number of times block c is executed, in traversing from block a (402) to block X (404), such that block X (404) is visited only once and given block c (406) is visited at least once, can be determined as follows. First, note that this value is a geometric random variable. This geometric random variable is defined by the probability that block c (406) will be visited by program execution again before reaching block X (404), or exiting the region of interest via y 410, given that the program execution starts in block c. This probability, p, can be computed by evaluating $P_0(c,c)$ using the reaching probability mapping given above after first setting the probability associated with the outgoing edges of block X (404) to zero.

Returning to FIG. 2, one or more of the calculations described above may be used to select spawn-target pairs 108, 104 (block 220). In one example, the path length (from block 212) and the path length variance (from block 214) may be used to estimate the probability of the path length falling within a certain range. This probability may then be used to determine the probability that the prefetch slack (from block 216) is above a certain number of cycles. This probability may also be used to determine a point in the main thread 118 where a given helper thread 112 will likely finish so that thread resources are freed. Such a calculation is useful to ensure prefetches are timely and may be used to determine a number of concurrent helper threads 112 at a given point so as to reduce the probability that a spawn point 108 would be ignored because there are not enough thread resources to spawn another helper thread 112.

For a given target t, a set of independent spawn points may be selected by computing a metric indicating their effectiveness. In particular, value(s,t) of a given spawn-point s may be computed as the product of several factors:

1. One of these factors is the likelihood the spawn s precedes the target t, quantified by the posteriori probability PPr(s|t).
2. Another one of these factors is the expected number of cache misses the helper thread will prefetch. One way of approximating this is by using the estimated cycles per instruction of the main thread (CPI_m), and helper threads (CPI_h), and also the mean path length between spawn and target (M), in combination with the path length variance (V). An example algorithm, "postfix_size", is provided below which assumes spawn-target path lengths take on a normal distribution.

```
postfix size:
    input       M, V    mean and variance of the path length between spawn and target
    constants   P       minimum probability an instruction is prefetched
                CPI_h   average cycles per instruction for the helper thread
                CPI_m   average cycles per instruction for the main thread
    result              the number of instructions prefetched with minimum probability P
begin:
    D = (CPI_m*M – O) / (CPI_h – CPI_m); // initial guess at maximum distance
    S = CPI_m*sqrt(V); // square root of V is the standard deviation
    do {
```

-continued

```
            T = (CPI_m*M − ((CPI_h − CPI_m)*D + O))/S
            Q = probability z < T, where z is the standard normal variable
            if Q < P
                    decrease M
    } while( (M > 0) &&(Q < P) );
    return M;
end
```

3. Another one of these factors is the probability the prefetched instructions are not evicted before being used. One method of approximating this value is to use the expected path footprint from the spawn to the target:

$$Pr = \begin{cases} 1 & \text{if expected path footprint from spawn to target is less than the I − cache size} \\ 0 & \text{otherwise} \end{cases}$$

4. Another one of these factors is the probability the prefetched instructions are not in the cache already. One method of approximating this value is to use the expected path footprint from target to spawn:

$$Pr = \begin{cases} 1/f & \text{if expected path footprint from target to spawn is less than the I-cache size} \\ 1 & \text{otherwise} \end{cases}$$

5. Another one of these factors is the probability the spawn-target pair would not imply more than the maximum desired number of helper threads to run concurrently at any point in the program. This value can be estimated as either zero if updating the estimated number of running helper threads, would cause more than the allowed number of threads to run concurrently at any point in the program, or one otherwise.

To keep track of the effect of the selected helper threads, a running estimate is kept of the remaining expected cache misses, and the number of running helper threads at each block in the main program. These estimates impact the selection of helper thread spawn-target pairs by ensuring spawn points are not selected if they cause the number of running threads to exceed the maximum allowed, or once a preset threshold level of instruction cache miss coverage for the targeted region is attained.

The I-cache coverage may be determined by finding the probability a helper thread for a given spawn-target pair will prefetch a given block. One example algorithm for doing this is "update_icache_coverage" given below.

The number of concurrently running helper threads at each point in the program may be determined by finding the probability a helper thread for a newly selected spawn-target pair will still be executing a given distance from the spawn point and then updating a prior estimate using the example algorithm "update_max_helpers".

```
update_icache_coverage:
    input       s, t        spawn, and target
                M, V        map from x and y to mean and variance of path lengths from x to y
                PP          map from x and y to posteriori probability of having seen y once at x
                RP          map from x and y to reaching probability from x to y
                I_r         map from basic block, to expected number of remaining I-cache
                            misses.
                I_o         map from basic block, to number of I-cache misses from profiling
                B           set of blocks with minimum distance from target less than maximum
                            distance thread can prefetch (see above algorithm)
                C           estimated spawn overhead (time to copy registers + precompute live-ins)
    constants   CPI_h       average cycles per instruction for the helper thread
                CPI_m       average cycles per instruction for the main thread
    result      updates I with the new expected number of misses in each block affected
begin
    L = postfix size( M(s,t), V(s,t) )
    foreach b in the set B
            if V(t,b) > 0,
                    T = (L−M(t,b))/sqrt(V(t,b))
                    Q = probability z < T, where z is the standard normal variable
            else
```

-continued

```
                    Q = 1, if M(t,b) < L, or zero otherwise
            end
            slack = CPI_h*M(s,t) + (CPI_m – CPI_h)*M(t,b) – C
            if V(s,t)+V(t,b) > 0,
                    W = sqrt( CPI_m*CPI_m*V(s,t) + (CPI_m-CPI_h)*(CPI_m-CPI_h)*V(t,b) )
                    X = slack / W
                    R = probability z < X, where z is the standard normal variable
            else
                    R = 1, if slack > 0, or zero otherwise
            end
            p = PP(b,s)*RP(s,t);
            I_r[b] = p*Q*R(I_o[b]-I_r[b]);
        end
end
update_max_helpers:
        inputs   s, t       spawn, and target
                 M, V       map from x and y to mean and variance of path lengths from x to y
                 PP         map from x and y to posteriori probability of having seen y once at x
                 H          map from basic block, to expected number of running helper threads
                 B          set of blocks with minimum distance from spawn less than maximum
                            distance thread can prefetch times CPI_h/CPI_m, plus C/CPI_m.
                 C          estimated spawn overhead (time to copy registers + precompute live-ins)
        constants CPI_h     average cycles per instruction for the helper thread
                 CPI_m      average cycles per instruction for the main thread
        result              updates H with the new expected number of misses in each block affected
begin
        L = postfix size( M(s,t), V(s,t) )
        D = L*(CPI_h/CPI_m) + C/CPI_m
        foreach b in the set B
                if V(s,b) > 0,
                        T = (M(s,b)-L)/sqrt(V(s,b))
                        Q = probability z < T, where z is the standard normal variable
                else
                        Q = 1, if M(s,b) < L, or zero otherwise
                end
                H[b] = H[b] + PP(b,s)*Q;
        end
end
```

The procedure for selecting a target 104 may start by ranking blocks according to the estimated remaining instruction cache misses and then selecting the "worst block." For the worst block, a set of potential targets is found be examining predecessors with high posteriori probability that have expected path length to the worst block less than a threshold distance. For each target t in order of decreasing PPr(t|w)*M(t,w) (i.e., posteriori probability and mean path length) those spawn points $S_a(t)$ with RP(s,t) greater than a threshold (say 95%) are chosen. The selected spawn points for the target, $S_b(t)$ is computed by considering each spawn point s in set $S_a(t)$ one at a time in decreasing order of expected path length to t. If spawn point s is implied by another spawn point already in $S_b(t)$ with higher value, s is discarded. If s does not imply another spawn in $S_b(t)$, it is added to $S_b(t)$. If s implies another spawn r in $S_b(t)$ and has a higher value, then r is removed from the set $S_b(t)$. If the set $S_b(t)$ is empty, the next prospective target is considered until a nonempty set of spawn-points is found, or the algorithm gives up trying to find a helper thread 112 to target the given block.

For example, consider the fragment of control flow graph in FIG. 4. Assume foo( ) has the control-flow graph as given in FIG. 6, and that each basic block has a length of ten. In this example, block X (404) is known from cache profiling to suffer many cache misses. Each edge is labeled with the probability that the main program will take the given path. The question is where on this graph is the best location to spawn a helper thread 112 to prefetch block X (404)?

The first thing to note is that all blocks in the example illustrated are highly control-flow correlated with block X (404). For instance, the probability of control flow going from block a (402) and reaching X (404) at least once before leaving the region along one of the edges x (406) or y (408) is equal to 0.971 even though the probability of going directly from a (402) to X (404) is only 0.098. Even so, not all spawn points 108 are necessary as effective as each other.

Two factors distinguish the possibilities. The expected path length between spawn point 108 and target point 104, and the probability a cache miss is likely after traversing the path to block X (404). Of interest is the expected instruction memory consumed by foo( ) 600 on the path leading to block X (404). If foo( ) 600 together with blocks b (412), c (406), and d (414) fit inside the instruction cache, then initiating a prefetch of block X (404) starting at block a (402) is good because the expected path length from block a (402) to block X (404) is on the order of nine loop iterations. On the other hand, if procedure foo( ) 600 is very large, there is no point in spawning a helper thread 112 directly targeting block X (404) from any block because the instructions it will fetch will almost certainly be evicted from the cache by a call to foo( ) 600 before the main thread 118 reaches block X (404) due to the low probability of branch b (416) transitioning to block X (404). On the other hand, if we instead choose to start the helper thread 112 executing at block b (412), this problem can be avoided because evaluating the branch at the end of block a (402) will determine whether to prefetch block X (404).

Due to the procedure call to foo( ) 600, there is a high probability the instruction memory footprint of the path taken from any block to block X (404) is larger than the cache. As a result, a spawn point 108 for a predecessor of block X (404) is selected, rather than selecting a spawn point 108 for block X (404). In this manner, the execution of the helper thread 112 decides whether to prefetch block X (404). In this example there are really two such locations: block b (412) and block d (414) are both likely predecessors with a short minimum path length to block X (404), however b (412) is better because there is a higher chance it precedes the target block X (404) for any given instance of block X (404). This fact can be quantified by computing the posteriori probability of having executed block b (412) given block X (404) is reached, and comparing the result with the posteriori probability of having executed block d (414) given block X (404) is reached. However, a spawn point 108 should be selected that results in enough slack to effectively prefetch the instructions in block X (404). If block d (414) is relatively large there might be enough slack to prefetch block X (404) starting at the beginning of block d (414).

Of course, a person of ordinarily skill in the art will readily appreciate that other selections algorithms may be used. For example, a plurality of spawn-target points may be selected and/or unselected before settling on one or more spawn-target pairs. In addition, one or more of the above types of calculations may be used to insert prefetch instructions in appropriate locations in an application. For example, if a compiler or a post-pass tool determines that a specific load instruction will likely miss, a slack computation (block 216) may be used to help decide a good location for prefetch instructions. An example of a simplifier heuristic currently used in practice is to simply add up the length of the blocks on the dominant paths from the prospective locations to the load instruction. However, the system disclosed herein can take account of "less dominant" paths to determine the slack more accurately potentially making much better prefetch instruction placement choices. Similarly, a reaching probability calculation (block 206) and/or a posteriori probability calculation (block 210) may be used to refine these types of choices.

Returning to FIG. 2, once a spawn-target pair 108, 104 is selected, the process 200 generates a helper thread 112 (block 222) and attaches the helper thread 112 to the software application (block 224). The helper thread 112 launches at the selected spawn point 108 to prefetch software instructions of the software application.

A block diagram of a computer system 700 that may implement the processes described above is illustrated in FIG. 7. The computer system 700 may be a personal computer (PC), a personal digital assistant (PDA), an Internet appliance, a cellular telephone, or any other computing device. In one example, the computer system 700 includes a main processing unit 702 powered by a power supply 703. The main processing unit 702 may include a multi-processor unit 704 electrically coupled by a system interconnect 706 to a main memory device 708 and to one or more interface circuits 710. In one example, the system interconnect 706 is an address/data bus. Of course, a person of ordinary skill in the art will readily appreciate that interconnects other than busses may be used to connect the multi-processor unit 704 to the main memory device 708. For example, one or more dedicated lines and/or a crossbar may be used to connect the multi-processor unit 704 to the main memory device 708.

Figure 7:
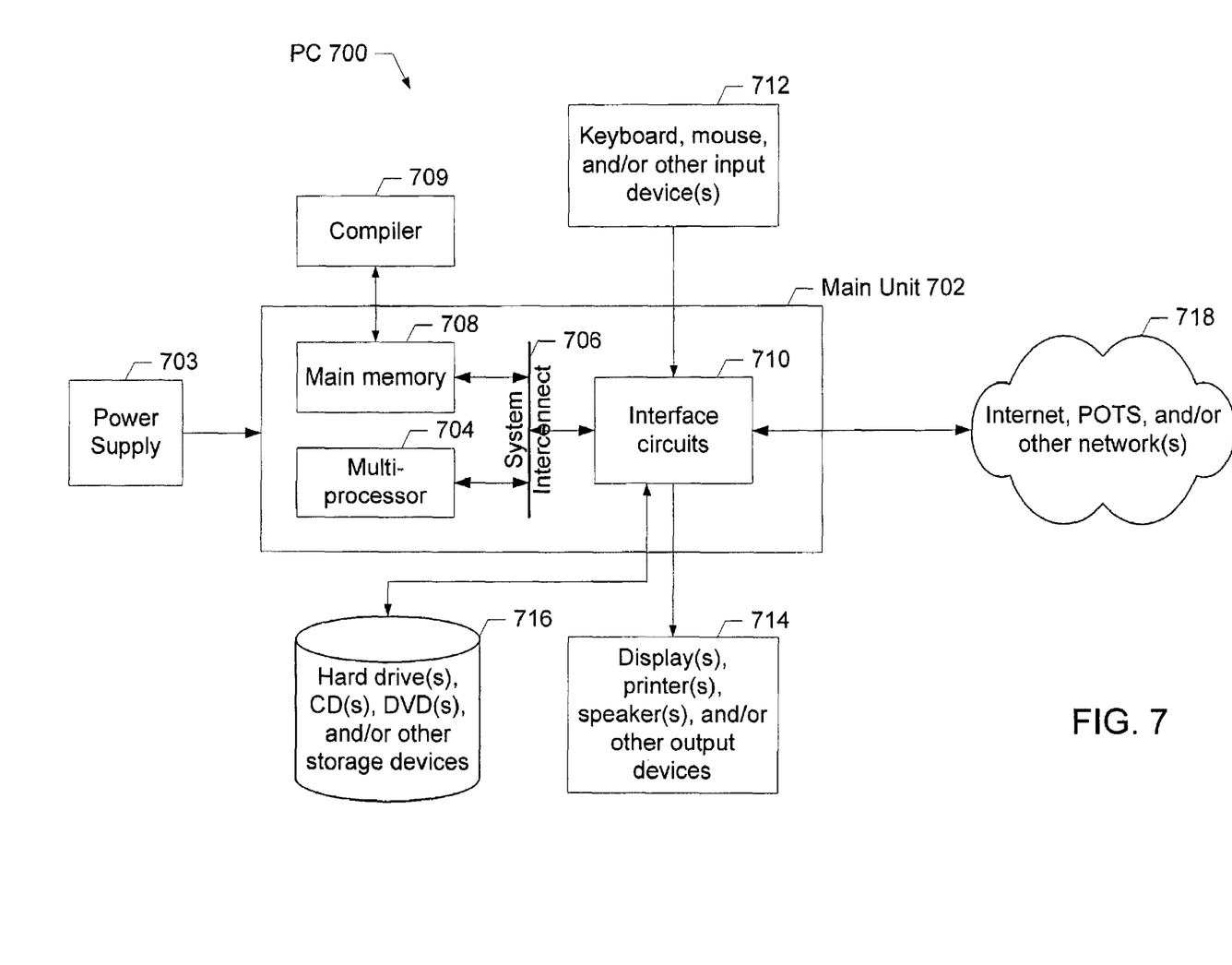
FIG. 7 is a block diagram of a computer system illustrating an environment for use for the disclosed system.

The multi-processor 704 may include any type of well-known processor, such as a processor from the Intel Pentium® family of microprocessors, the Intel Itanium® family of microprocessors, and/or the Intel XScale® family of processors. In addition, the multi-processor 704 may include any type of well-known cache memory, such as static random access memory (SRAM). The main memory device 708 may include dynamic random access memory (DRAM) and/or any other form of random access memory. For example, the main memory device 708 may include double data rate random access memory (DDRAM). The main memory device 708 may also include non-volatile memory. In one example, the main memory device 708 stores a software program which is executed by the multi-processor 704 in a well known manner. The main memory device 708 may store a compiler program 709 for execution by the multi-processor 704.

The interface circuit(s) 710 may be implemented using any type of well known interface standard, such as an Ethernet interface and/or a Universal Serial Bus (USB) interface. One or more input devices 712 may be connected to the interface circuits 710 for entering data and commands into the main processing unit 702. For example, an input device 712 may be a keyboard, mouse, touch screen, track pad, track ball, isopoint, and/or a voice recognition system.

One or more displays, printers, speakers, and/or other output devices 714 may also be connected to the main processing unit 702 via one or more of the interface circuits 710. The display 714 may be a cathode ray tube (CRT), a liquid crystal displays (LCD), or any other type of display. The display 714 may generate visual indications of data generated during operation of the main processing unit 702. The visual indications may include prompts for human operator input, calculated values, detected data, etc.

The computer system 700 may also include one or more storage devices 716. For example, the computer system 700 may include one or more hard drives, a compact disk (CD) drive, a digital versatile disk drive (DVD), and/or other computer media input/output (I/O) devices.

The computer system 700 may also exchange data with other devices via a connection to a network 718. The network connection may be any type of network connection, such as an Ethernet connection, digital subscriber line (DSL), telephone line, coaxial cable, etc. The network 718 may be any type of network, such as the Internet, a telephone network, a cable network, and/or a wireless network.

Figure 8:
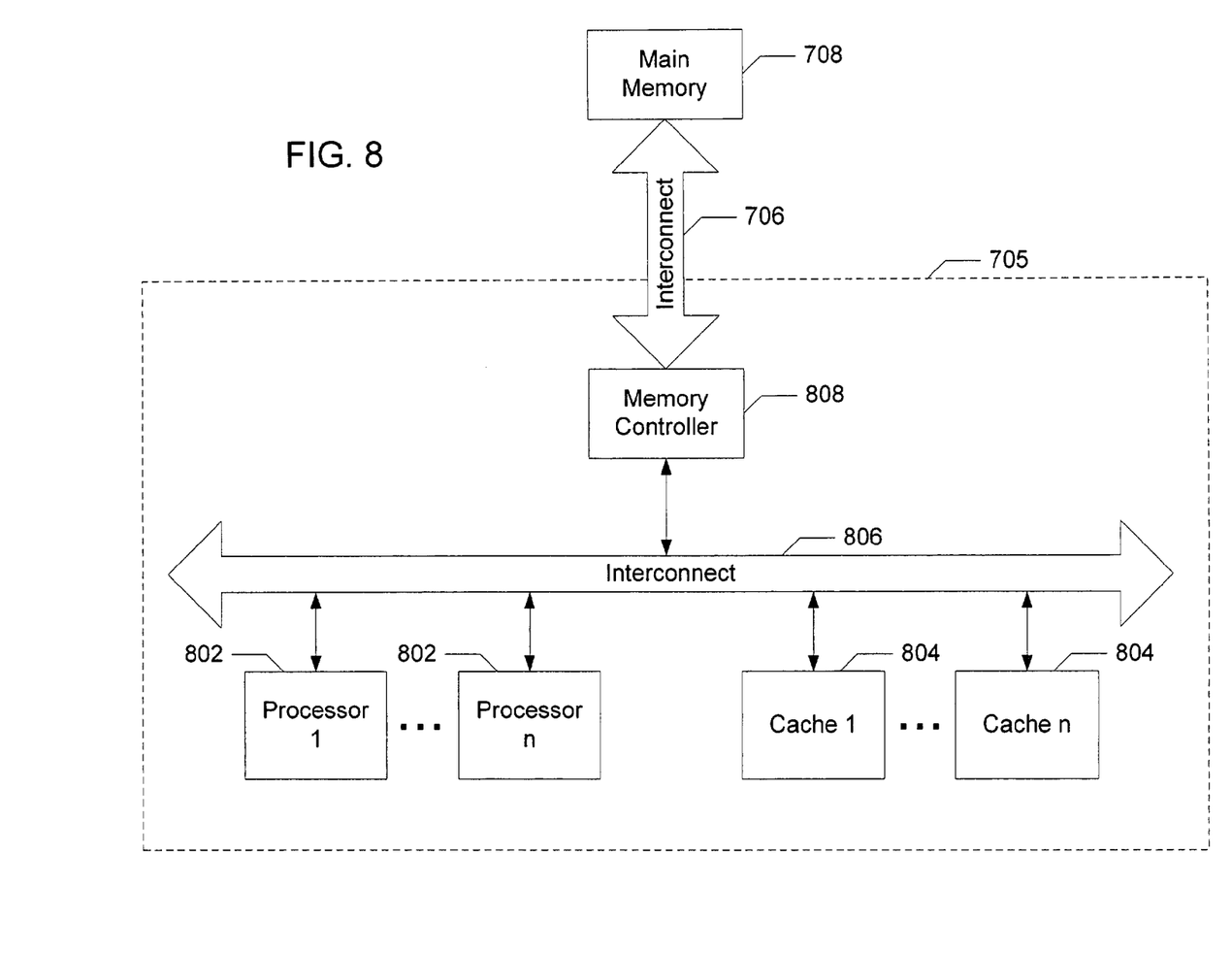
FIG. 8 is a more detailed block diagram of the multi-processor illustrated in FIG. 7.

A more detailed block diagram of the multi-processor unit 704 is illustrated in FIG. 8. The multi-processor 704 shown includes one or more processing cores 802 and one or more caches 804 electrically coupled by an interconnect 806. The processor(s) 802 and/or the cache(s) 804 communicate with the main memory 708 over the system interconnect 706 via a memory controller 808.

Each processor 802 may be implemented by any type of processor, such as an Intel XScale® processor. Each cache 804 may be constructed using any type of memory, such as static random access memory (SRAM). The interconnect 706 may be any type of interconnect such as a bus, one or more dedicated lines, and/or a crossbar. Each of the components of the multi-processor 704 may be on the same chip or on separate chips. For example, the main memory 708 may reside on a separate chip.

Although the above discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software exclusively in firmware or in some combination of hardware, firmware and/or software.

In addition, although certain apparatus have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A method of generating a speculative helper thread, the method comprising:
   identifying a code region in main thread software instructions based on cache misses;
   selecting a spawn-target pair, the spawn-target pair including a target point preceding the code region and a spawn point preceding the target point, the spawn-target pair selection being based on a spawn-target selection calculation, comprising calculating a posteriori probability associated with the spawn-target pair;
   generating helper thread software instructions to launch a helper thread at the spawn point to prefetch a subset of the main thread software instructions, wherein the spawn-target selection calculation is indicative of the benefit of the helper thread; and
   attaching the helper thread software instructions to the main thread software instructions.

2. A method as defined in claim 1, wherein calculating the posteriori probability associated with the spawn-target pair comprises determining a plurality of path probabilities.

3. A method as defined in claim 1, wherein the spawn-target selection calculation further comprises calculating an expected path length between the spawn point and the target point.

4. A method as defined in claim 1, wherein the spawn-target selection calculation further comprises calculating a path length variance between the spawn point and the target point.

5. A method as defined in claim 1, wherein the spawn-target selection calculation further comprises calculating a prefetch slack associated with the spawn-target pair.

6. A method as defined in claim 5, wherein calculating the prefetch slack comprises determining a difference in execution cycles between a prefetch of an instruction by the helper thread and an attempted fetch of the instruction by the main thread.

7. A method as defined in claim 6, wherein the spawn-target selection calculation further comprises calculating an expected path length between the spawn point and the target point.

8. A method as defined in claim 7, wherein the spawn-target selection calculation comprises calculating a path length variance between the spawn point and the target point.

9. A method as defined in claim 1, wherein spawn-target selection calculation further comprises calculating an expected path footprint.

10. A method as defined in claim 9, wherein calculating the expected path footprint comprises calculating an average amount of memory required to store a plurality of instructions along a path defined by two instructions in the main thread.

11. A method as defined in claim 1, further comprising calculating a reaching probability associated with the spawn-target pair.

12. A method as defined in claim 11, wherein calculating the reaching probability comprises determining a product of a plurality of path probabilities.

13. A method as defined in claim 1, wherein identifying a code region in main thread software instructions comprises reading profile information associated with the main thread software instructions.

14. A method as defined in claim 13, wherein reading profile information associated with the main thread software instructions comprises reading profile information associated with the main thread software instructions to identify a code region in the main thread software instructions that incurs performance loss due to instruction-cache misses.

15. A method as defined in claim 1, wherein the spawn-target selection calculation is based on a path expression mapping.

16. A method as defined in claim 1, wherein selecting a spawn-target pair comprises unselecting one or more other spawn-target pairs.

17. A machine readable medium storing instructions structured to cause a machine to:
   identify a code region in the main thread software instructions based on cache misses;
   select a spawn-target pair, the spawn-target pair including a target point preceding the code region and a spawn point preceding the target point, the spawn-target pair selection being based on a spawn-target selection calculation, comprising calculating a posteriori probability associated with the spawn-target pair;
   generate helper thread software instructions to launch a helper thread at the spawn point to prefetch a subset of the main thread software instructions; and
   attach the helper thread software instructions to the main thread software instructions.

18. A machine readable medium as defined in claim 17, wherein the instructions are structured to cause the machine to calculate an expected path length between the spawn point and the target point.

19. A machine readable medium as defined in claim 17, wherein the instructions are structured to cause the machine to calculate a path length variance between the spawn point and the target point.

20. A machine readable medium as defined in claim 17, wherein the instructions are structured to cause the machine to calculate a prefetch slack associated with the spawn-target pair.

21. A machine readable medium as defined in claim 17, wherein the instructions are structured to cause the machine to calculate an expected path footprint.

22. A machine readable medium as defined in claim 17, wherein the instructions are structured to compile the main thread.

23. A machine readable medium as defined in claim 22, wherein the subset of the main thread software instructions prefetched by the helper thread are structured to be executed by spare hardware resources on a simultaneous multi-threading (SMT) processor.

24. A machine readable medium as defined in claim 17, wherein the spawn-target selection calculation is based on a path expression mapping.

25. A computer comprising:
   a processor;
   a memory operatively coupled to the processor, the memory storing a software tool and an application program, the software tool causing the computer to:
      identify a code region in the application program based on cache misses;
      select a spawn-target pair in the application program, the spawn-target pair including a target point preceding the code region and a spawn point preceding the target point, the spawn-target pair selection being based on a spawn-target selection calculation, comprising calculating a posteriori probability associated with the spawn-target pair;
      generate helper thread instructions to launch a helper thread at the spawn point to prefetch a subset of the application program; and attach the helper thread instructions to the application program.

26. A computer as defined in claim 25, wherein the software tool causes the computer to calculate an expected path length between the spawn point and the target point.

27. A computer as defined in claim 25, wherein the software tool causes the computer to calculate a path length variance between the spawn point and the target point.

28. A computer as defined in claim 25, wherein the software tool causes the computer to calculate a prefetch slack associated with the spawn-target pair.

29. A computer as defined in claim 25, wherein the software tool causes the computer to calculate an expected path footprint.

30. A computer as defined in claim 25, wherein the processor comprises a simultaneous multi-threading (SMT) processor.

31. A computer as defined in claim 25, wherein the spawn-target selection calculation is based on a path expression mapping.

* * * * *